United States Patent
Kline, Jr.

(10) Patent No.: US 8,706,263 B2
(45) Date of Patent: Apr. 22, 2014

(54) SYNCHRONIZATION OF EXECUTION OF SEQUENTIAL FUNCTION CHARTS USING TRANSITION GROUPS

(75) Inventor: Robert C. Kline, Jr., Phoenix, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 358 days.

(21) Appl. No.: 12/844,178

(22) Filed: Jul. 27, 2010

(65) Prior Publication Data

US 2011/0301725 A1    Dec. 8, 2011

Related U.S. Application Data

(60) Provisional application No. 61/352,788, filed on Jun. 8, 2010.

(51) Int. Cl.

| G01B 5/00 | (2006.01) |
|---|---|
| G04F 1/00 | (2006.01) |
| G05B 11/01 | (2006.01) |
| G05B 15/00 | (2006.01) |
| G06F 3/048 | (2013.01) |
| G06F 17/00 | (2006.01) |

(52) U.S. Cl.
USPC ............ 700/11; 700/19; 700/83; 700/90; 702/33; 702/176; 715/771; 715/839; 715/965; 715/970

(58) Field of Classification Search
USPC .......... 700/17, 19, 20, 65, 83, 11, 90; 702/33, 702/176; 715/771, 839, 965, 970
See application file for complete search history.

(56) References Cited

U.S. PATENT DOCUMENTS

| 5,426,730 | A | * | 6/1995 | Miyake et al. ................ 715/839 |
|---|---|---|---|---|
| 5,485,620 | A | * | 1/1996 | Sadre et al. .................... 717/162 |
| 5,590,253 | A | * | 12/1996 | Onishi et al. .................. 345/619 |
| 5,631,825 | A | * | 5/1997 | van Weele et al. ............ 700/83 |
| 5,644,487 | A | * | 7/1997 | Duff et al. ........................ 700/56 |
| 5,787,282 | A | * | 7/1998 | Tanaka et al. ................. 717/101 |
| 5,793,947 | A | * | 8/1998 | Sakamoto ....................... 714/45 |
| 5,797,282 | A | * | 8/1998 | Bodin ........................... 66/169 R |

(Continued)

FOREIGN PATENT DOCUMENTS

JP              10240314 A    *   9/1998

OTHER PUBLICATIONS http://www.iea.lth.se/publications/MS-Theses/Full%20document/5152_full_document.pdf (2001).*
"Extended European Search Report", [Oct. 28, 2013], 12 pages.

*Primary Examiner* — Mohammad Ali
*Assistant Examiner* — Jennifer L Norton
(74) *Attorney, Agent, or Firm* — Fletcher Yoder, P.C.; Alexander R. Kuszewski; John M. Miller

(57) ABSTRACT

Systems and methods are provided that are capable of synchronizing an industrial process. The industrial process may include a plurality of process levels. A visualization group may be displayed, showing the various levels of a process. A transition group may be graphically defined that allows for the linking of the transitions between the various process levels. In certain embodiments, sequential function charts (SFC) may include expanded capabilities that allow for the visual definition, editing, and review of the transition groups. Such SFC embodiments may be capable of process flow synchronization across any levels of the modeled process.

22 Claims, 20 Drawing Sheets

(56) References Cited

U.S. PATENT DOCUMENTS

| | | | |
|---|---|---|---|
| 5,841,656 A * | 11/1998 | Taruishi | 700/86 |
| 5,860,009 A * | 1/1999 | Uchihira et al. | 717/149 |
| 6,256,598 B1 * | 7/2001 | Park et al. | 703/2 |
| 6,290,403 B1 * | 9/2001 | Onishi et al. | 712/200 |
| 6,795,739 B2 * | 9/2004 | Graf et al. | 700/86 |
| 6,834,370 B1 * | 12/2004 | Brandl et al. | 715/201 |
| 6,859,898 B1 * | 2/2005 | Yamashita et al. | 714/55 |
| 6,901,316 B1 | 5/2005 | Jensen et al. | |
| 6,908,557 B2 * | 6/2005 | Chordia et al. | 210/659 |
| 7,190,382 B1 | 3/2007 | Retlich et al. | |
| 7,707,126 B2 | 4/2010 | Klein et al. | |
| 7,734,492 B2 * | 6/2010 | Sun et al. | 705/7.12 |
| 2003/0220709 A1 * | 11/2003 | Hartman et al. | 700/121 |
| 2004/0088119 A1 * | 5/2004 | Landgraf | 702/33 |
| 2005/0198613 A1 * | 9/2005 | Denzlein | 717/101 |
| 2008/0126973 A1 | 5/2008 | Kline | |
| 2009/0089674 A1 | 4/2009 | Silvestro et al. | |
| 2010/0262265 A1 * | 10/2010 | Karaffa | 700/87 |
| 2012/0291003 A1 * | 11/2012 | Raghavan et al. | 717/104 |

* cited by examiner

SYNCHRONIZATION OF EXECUTION OF SEQUENTIAL FUNCTION CHARTS USING TRANSITION GROUPS

CROSS REFERENCE TO RELATED APPLICATIONS

This application is a Non-provisional Patent Application of U.S. Provisional Application No. 61/352,788 entitled "SYNCHRONIZATION OF SEQUENTIAL FUNCTION CHART EXECUTION USING TRANSITION GROUPS", filed Jun. 8, 2010, which is herein incorporated by reference.

BACKGROUND

The present invention relates generally to control systems and, more particularly, to integrated optimization and control for production plants using sequential function charts.

Integrated optimization and control of process plants has long been of interest due to the potential economic benefits that such an approach could offer. A number of solutions have been proposed in the past and some commercially available software offerings have attempted to meet the enormous demand for such solutions. In particular, control embodiments capable of controlling sequential processes have been developed. For example, the International Electrotechnical Commission standard IEC-61131 Part 3 includes a graphical language referred to as sequential function chart (SFC) that allows for a method of programming a sequential process, such as a batch process, among others. The SFC standard includes three main components; steps, actions, and transitions. Steps may be considered as logic containers, i.e., a unit of programming logic suitable for accomplishing a particular control task. Actions may be considered as the individual aspects of the particular control task. Transitions allow for logic capable of transferring control from the active step to a next step in the process.

The SFC program is similar to a flowchart in that it allows for a visual representation of the process. Further, the processor executing the SFC program is capable of navigating through the steps and transitions of the program to perform specific operations defined by the actions, iterate through any repetitive sequences of operations, and so forth, so as to perform the various steps in the flowchart. Additionally, while sequential or batch processes are a good fit to the SFC paradigm, other processes using high-level management of multiple operations, state machine operations, and so forth, may suitably use SFC. However, some key technological challenges to the implementation of such SFC solutions have persisted, including, for example, the ability to coordinate among steps, such as when executing steps in a system capable of parallel execution.

BRIEF DESCRIPTION

The present disclosure provides novel techniques for optimizing and controlling industrial plants using SFC, including hierarchies of SFCs. An SFC hierarchy, for example, may consist of a batch procedure at a highest level, followed by a unit procedure level at a lower level, followed by a unit operations lower level, followed by an equipment phase lower level, and so forth. The SFC techniques disclosed herein include the ability to synchronize the start of execution of steps within parallel procedural control sequences across two or more charts. That is, synchronization of execution may be possible across all levels of SFC including, equipment phases, unit operations, unit procedures, batch procedures, and so forth. It is to be understood that the nomenclature used herein, such as "batch procedure", "unit procedure", "unit operations", "equipment phase", and so on may be different depending on the use of a particular software tool or on a particular interpretation of the IEC-61131 standard or a standard such as the ANSI/ISA S88.01 standard. That is, in some implementations, any nomenclature may be used to denote the levels of the SFC. For example, in some implementations, the nomenclature of levels from highest to lowest may be "procedure", "unit procedure", "operation", "phase" and so forth.

In one embodiment, a grouping of transitional conditions may be employed. The transition group may be defined at the first parent or ancestor that is common across synchronization levels. For example, if it is desired to synchronize two unit operations, the higher-level parent unit procedure may be used as a placeholder for the transition group. The transition group may include a visual indication of the members of the transition group, as described in more detail below. The techniques disclosed herein also include a mechanism for grouping the transitions, for example, by using a sequence editor (e.g., graphical editor, recipe editor). The disclosed techniques also include a mechanism for discovering the members of a transition group, a mechanism to evaluate expressions, such as logic or mathematical expressions, in a transition group, and other SFC enhancements to support the behavior and creation of synchronized charts. The simplicity and flexibility of the synchronized SFC may allow for the creation of efficient and powerful control models capable of optimizing and controlling a wide variety of industrial processes. Additionally, the techniques disclosed herein are applicable not only to SFC but to other methodologies and languages that employ hierarchical structures, including charting structures. For example, ladder logic languages, state machine languages, and even languages that are more textual in nature, e.g., control languages, C/C++, Java, .NET languages, and so forth.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
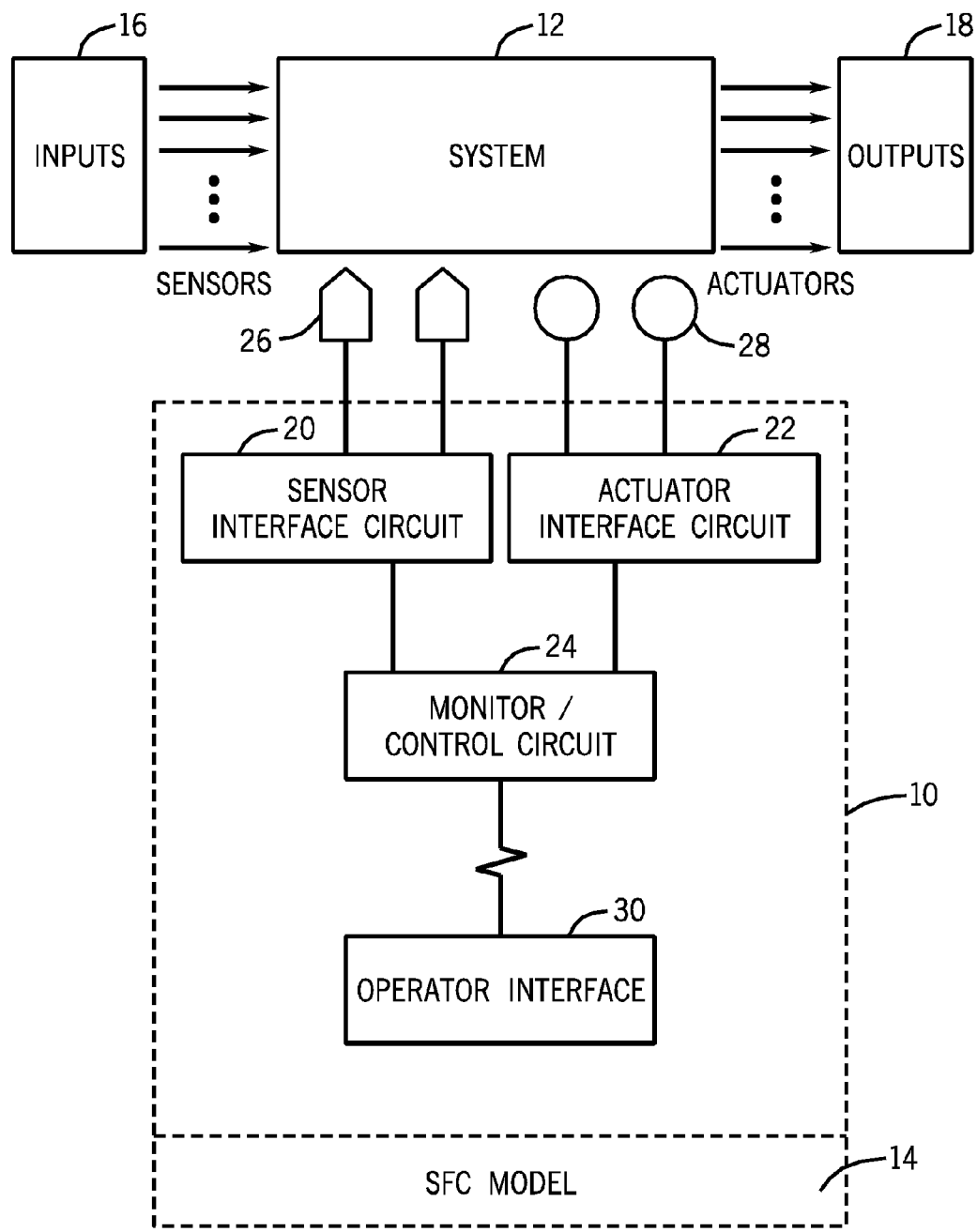
FIG. 1 is a block diagram of an automation controller, in accordance with one aspect of the disclosure.

FIG. 1 illustrates an embodiment of an automation controller 10 that is capable of controlling embodiments of a system 12. The system 12 may include a plurality of industrial system embodiments such as a manufacturing plant, an oil refinery, a chemical plant, a power generation facility, and others. The industrial controller 10 may include embodiments of an SFC model 14 capable of managing all aspects of the system 12, including control, simulation, and/or optimization. For example, the SFC model 14 may be capable of process control, batch control, quality control, and so forth.

The system 12 receives a set of inputs 16 and produces a set of outputs 18. The inputs 16 may include process inputs (e.g., types of materiel, quantities of materiel, product delivery schedules), financial inputs (e.g., accounting data, economic data), regulatory inputs (e.g., emission constraints, regulatory rules), and so forth. The outputs 18 may include manufactured products, refined products (chemicals, gasoline, coal), power (e.g., electricity), and so forth. Indeed, the system 12 is capable of receiving any number of inputs 16 and using the inputs 16 to produce a set of outputs 18.

In certain embodiments, the industrial controller 10 includes a sensor interface circuit 20, an actuator interface circuit 22, and a monitor/control circuit 24. The sensor interface circuit 20 is capable of communicating with a plurality of sensors 26. The sensors 26 may be capable of sensing a number of inputs 16 as well as signals internal to the system 12, such as temperature measurements, liquid levels, chemical composition, flow measurements, pressure measurements, electrical measurements, and so forth. Accordingly the sensors 26 may include temperature sensors, optical sensors, chemical sensors, pressure sensors, flow volume sensors, valve position sensors, speed sensors, vibration sensors, voltage sensors, amperage sensors, and so forth. Indeed, any type of sensing device may be used. The sensor interface circuit 20 may interface with the monitor/control circuit 24 so as to communicate measurements and other data based on the inputs 16 and on signals from the sensors 26. The monitor/control circuit 24 may then transform the inputted data into control signals suitable for use by the actuator interface circuit 22. The actuator interface circuit 22 may utilize a plurality of actuators 28 to perform any number of actions such as adjusting a valve position, moving a conveyor belt, controlling a robotic device, and so forth.

An operator interface 30 is communicatively connected with the monitor/control circuit 24 and used to aid an operator in interfacing with the monitor/control circuit 24. The operator interface 30 may be capable of interfacing with the monitor/control circuit 24, modifying data, modifying the SFC model 14, and so forth. In certain embodiments, the operator interface 30 may remotely located and may communicate through a network such as a local area network (LAN), the internet, or a wide area network (WAN). The SFC 14 model may include computer instructions, including graphical programming instructions, capable being executed by the monitor/control circuit 24. Accordingly, the computer instructions are capable of processing sensor data and other inputs, and applying logic to the inputs, so as to produce a set of outputs. The outputs may be used by the monitor/control circuit 24 in order to issue a set of commands to the actuator interface circuit 22. The actuator interface circuit 22 may then issue a set of signals suitable for controlling the actuators 28.

Figure 2:
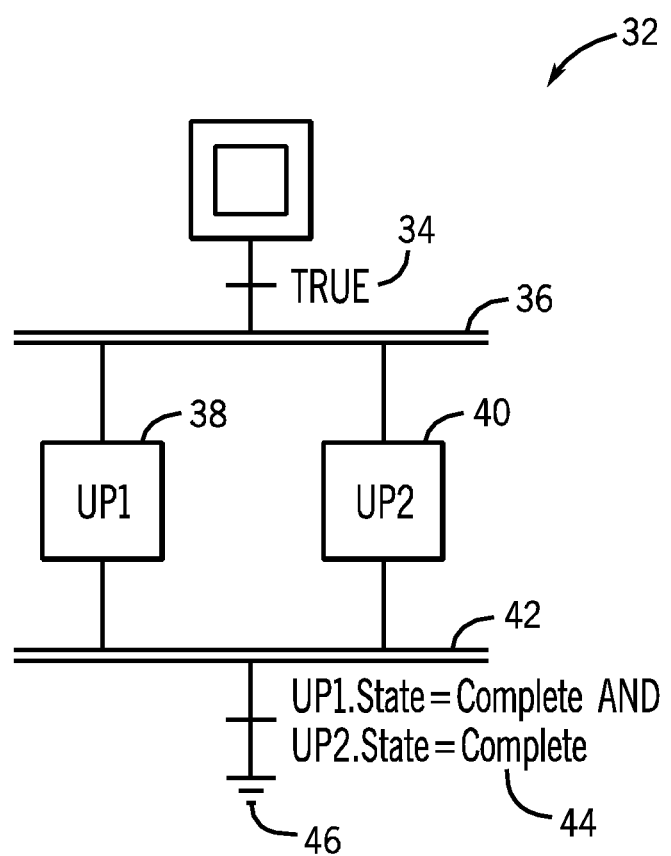
FIG. 2 is a SFC, in accordance with one aspect of the disclosure.

FIG. 2 illustrates an embodiment of an SFC 32. The SFC 32 provides a graphical representation of a batch procedure sequence's logic flow. In the depicted embodiment, the logic flow goes through the "TRUE" transition 34 and encounters an "AND" divergence 36. The "AND" divergence 36 represents multiple procedures which are processed concurrently. The SFC 32 has two unit procedures UP1 38, UP2 40, that may need significant coordination, such as coordination between SFC charts in their lower level. That is, the batch procedure sequence structure of the SFC 32 contains two unit procedures UP1 38 and UP2 40 that run in parallel and require synchronization between the two contained unit procedures 38, 40. After execution and synchronization of the unit procedures 38, 40, the logic flow converges in an "AND" convergence 42. A transition 44 then evaluates, and if both UP1.State and UP2.State variables are set to "Complete", the SFC 32 terminates in a final step 46. It is to be understood that the term "process" as used herein may refer to a chart (i.e., sequence or recipe) at any level, as well as a transition. Accordingly, the sequential processes following a transition include all the charts and all the transitions that come after the transition.

Figure 3:
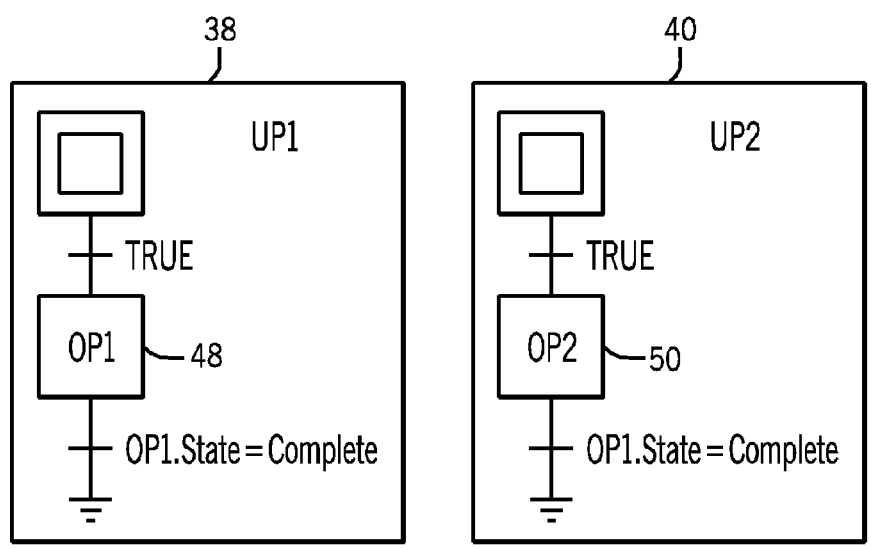
FIG. 3 is a pair of SFCs, in accordance with one aspect of the disclosure.
Figure 4:
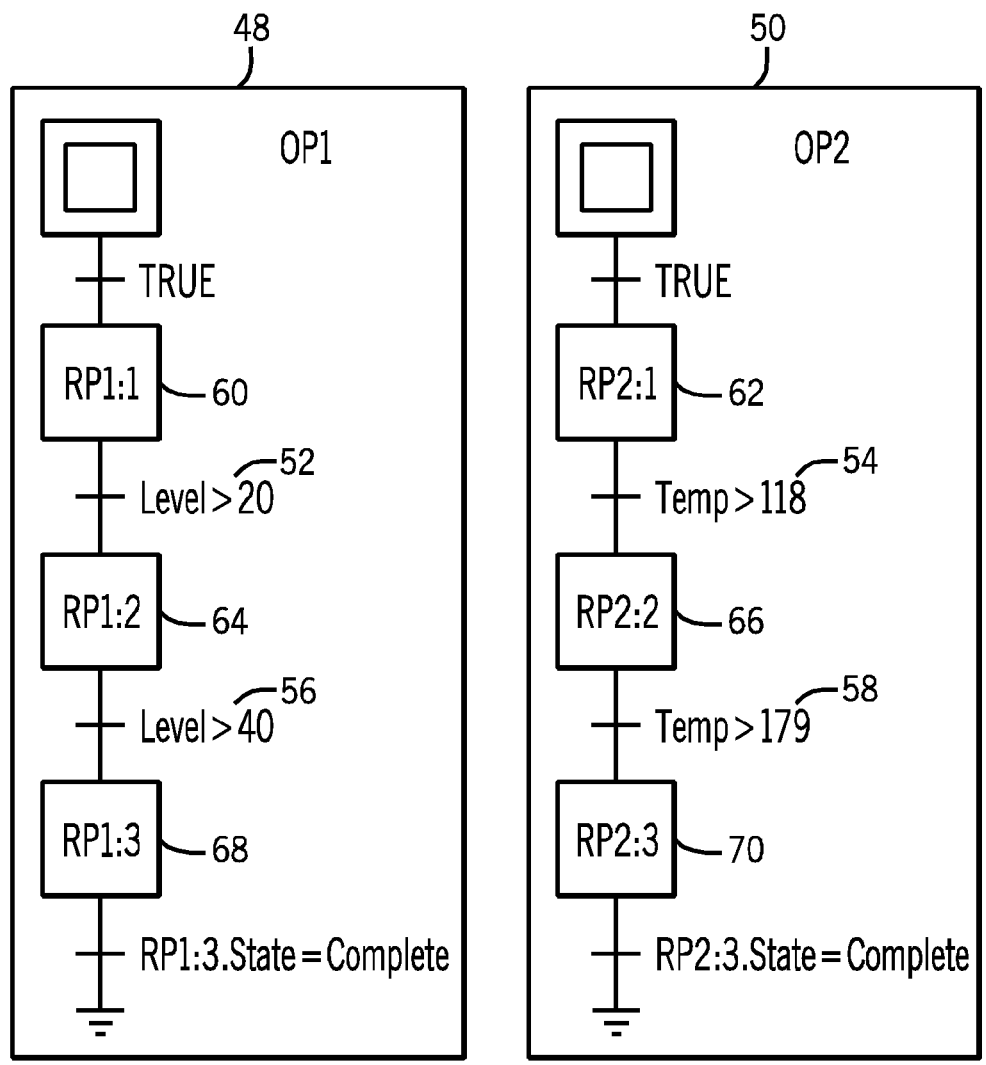
FIG. 4 is another pair of SFCs, in accordance with one aspect of the disclosure.

For purposes of simplicity, in an exemplary embodiment each unit procedure UP1 38, UP2 40 is a simple "hello world" SFC as illustrated in FIG. 3. Therefore, the operations OP1 48, OP2 50 that would run in parallel appear as illustrated in FIG. 4. In one example, it would be desirable for transitions 52 and 54 to fire in a "linked fashion, and also for transitions 56 and 68 to fire in a linked fashion. That is, the "Level >20" transition 52 and "Temp >118" transition 54 would be parallel transitions that fire simultaneously. Similarly, the "Level >40" transition 56 and "Temp >179" transition 58 would also be parallel transitions and fire simultaneously after completion of the previous transitions (i.e., "Level >20" and "Temp >118"). Accordingly, this has the effect of synchronizing the start of execution of three pairs of equipment phases across the two parallel executing operations. These pairs are RP1:1 60 and RP2:1 62, RP1:2 64 and RP2:2 66, and RP1:3 64 and RP2:3 70. One approach to synchronization would be to split each unit procedure 38, 40 into three separate unit procedures, and restructure the SFC recipe 32. The SFC recipe or sequence 32 may be restructured as a batch procedure 72, as illustrated in FIG. 5.

Figure 5:
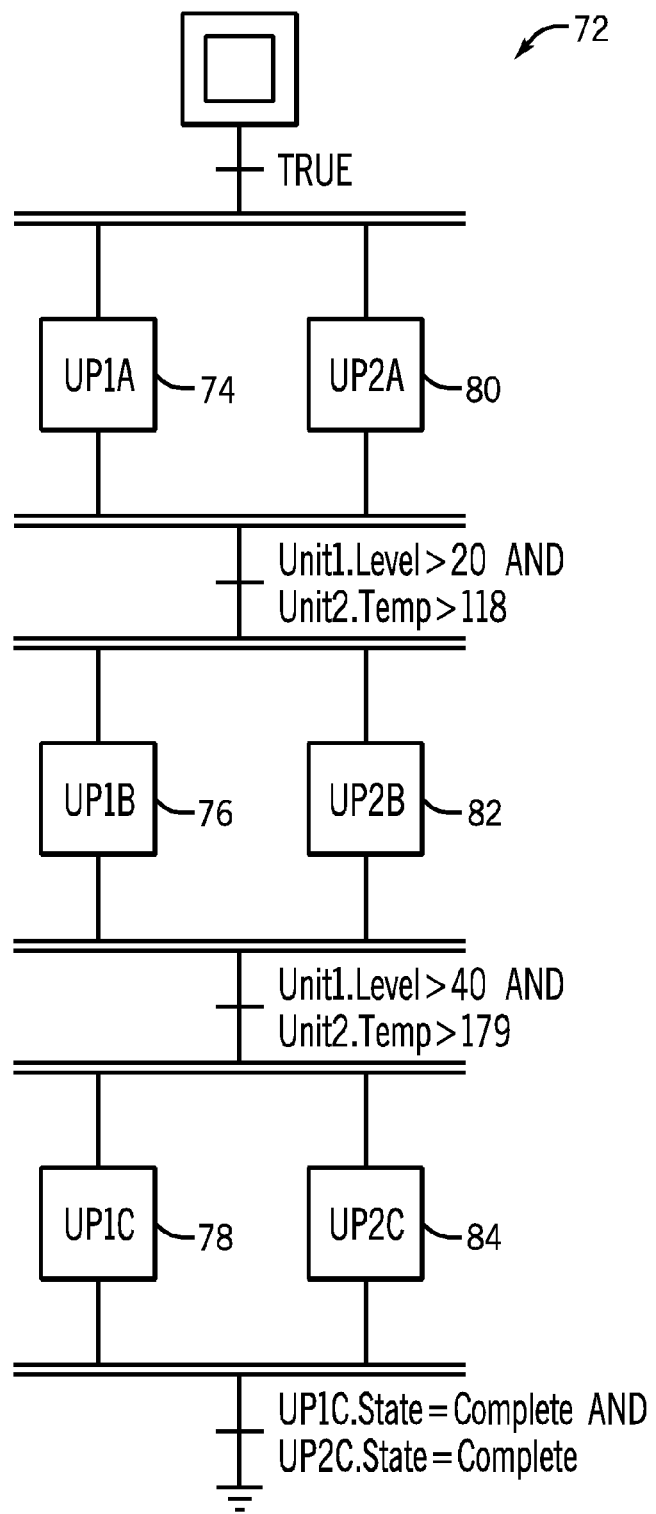
FIG. 5 is a second SFC, in accordance with one aspect of the disclosure.

FIG. 5 illustrates the batch procedure 72, where the two UP1 38, UP2 40 unit procedures of FIG. 2 are split into UP1A 74, UP1B 76, UP1C 78, and UP2A 80, UP2B 82, and UP2C 84 respectively. For such a split to function as desired, the unit procedures 74-84 would need to be "hello world" SFC structures. Additionally, the unit operations (i.e., the level below the unit procedures) contained inside of UP1A 74, UP2A 80, UP1B 76, and UP2B 82 would differ from a simple "hello world" SFC in that they would have a FALSE expression on their final transition so that the contained phases would not be stopped until the batch procedure level transition fired. The unit operations contained inside of UP1C 78 and UP2C 84 would be standard "hello world" SFC structures. Accordingly, the equipment phases (i.e., recipe phases RP) may be physically stopped by the automation controller 10 and restarted when, for example, the batch procedure level transitions fire.

Figure 6:
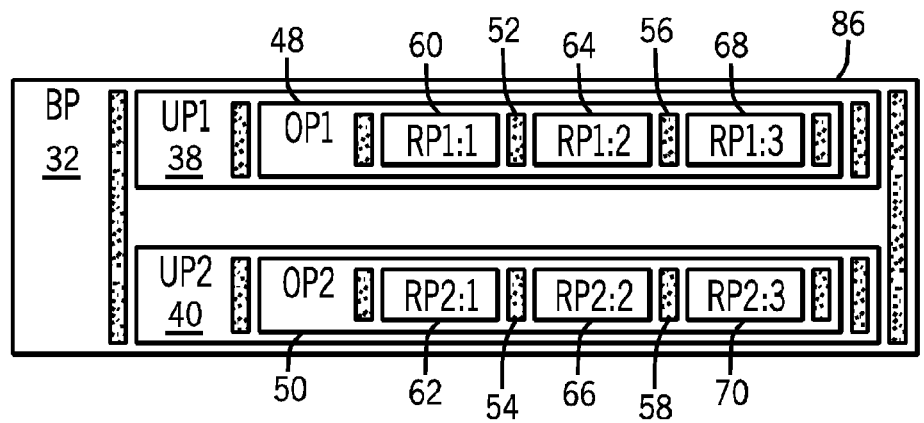
FIG. 6 is an embodiment of a group visualization, in accordance with one aspect of the disclosure.

FIG. 6 depicts an embodiment of a novel visualization grouping mechanism 86 (i.e., visualization group) capable of visualizing SFCs, including hierarchical SFCs such as the SFC 32 of FIG. 2. Indeed, such a visualization mechanism is also capable of firing the transitions as a set as described with more detail below with respect to FIG. 7, resulting in an improved synchronization of processes and control actions as well as enhanced visualization of such synchronizations while not requiring the restructuring of the SFC hierarchy (such as the restructuring depicted in FIG. 5). In the illustrated embodiment of FIG. 6, each procedure 32, 38, 40, 48, 50, is depicted as a horizontal bar. Lower level sequences are represented as smaller bars contained within the larger bars. In general, the longer a bar, the longer a sequence is expected to run. Transitions, such as transitions 52, 54, 56, and 58, are represented as shaded narrow bars. It is to be understood that other visualizations may be used, for example flashing bars to denote transitions currently executing, colored bars to denote synchronized transitions, and so forth. The visualization group 86 may be displayed by a software tool, for example, FactoryTalk® Batch, available from Rockwell Automation of Milwaukee, Wis. Accordingly, a user action such as a double-click or some other similar mechanism may be used by the software tool to view and/or edit any item in the group, including transition expressions (i.e., the logic expressions defining a transition). Additionally, a sequence may be visualized that indicates "grouped" transitions by depicting a link between the transitions. In one embodiment, such a link may include a vertical link that displays the links and transitions as "lined-up" with the vertical links representing that the transitions should fire at the same time, or more generally, in some type of synchronicity. In another embodiment, the links may not line up (i.e., may be angled or curved). Such angled or curved links may still represent that the transition should fire at the same time but may be angled or curved to accommodate longer or shorter process for better fidelity of display in the length of execution of the processes. The links may be flashing to denote currently executing transition groups, or may be colored to denote transition types such as deadlocked transitions (i.e., transitions that may not complete execution because they depend on each other), and so forth.

Figure 7:
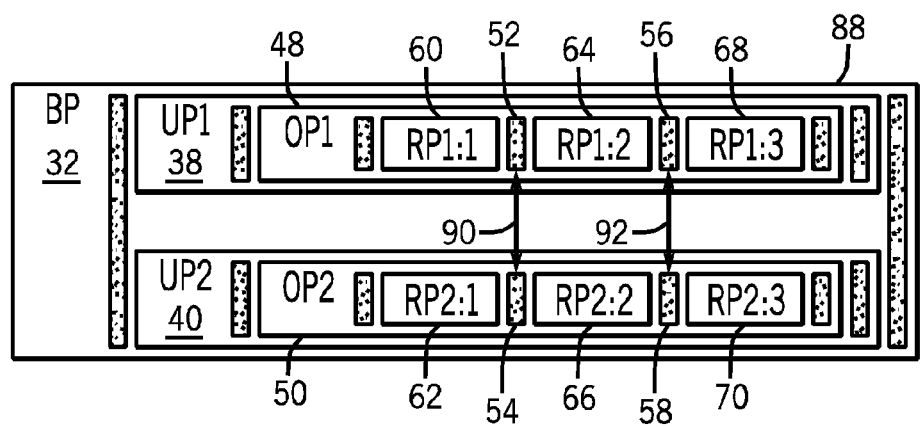
FIG. 7 is another embodiment of a transition group visualization, in accordance with one aspect of the disclosure.

FIG. 7 illustrates an embodiment of a visualization group 88 where vertical links 90, 92 represent the synchronization between transitions 52, 54, and 56, 58, respectively. The visualization group 88 in this embodiment may also include horizontal bars, vertical bars, and labels. Additionally, vertical links are used to represent a transition group visualization enabling synchronization between the transitions in the group. For example, vertical link 90 represents the synchronization between transition 52 and transition 54. Accordingly, the automation controller 10 would wait until both transitions have conditional expressions that evaluate to true before continuing execution of procedures 64 and 66. Likewise, vertical link 92 represents the synchronization between transition 56 and transition 58. Such visualization is capable of providing an easily understandable depiction of grouped transitions. Indeed, the visual techniques enable a user to quickly and accurately visualize the interconnections between a group and to also get a general idea of length of process by using the links as well as the lengths of the horizontal bars, respectively. Such techniques remove the necessity for splitting unit procedures into multiple unit procedures, as described above with respect to FIG. 5. Indeed, such techniques provide for a suitable method of constructing sequences that are capable of inter-unit coordination. As an example, a "ready to dump" and "dump" handshake between two units could be handled by linking two transitions between the unit operations.

Figure 8:
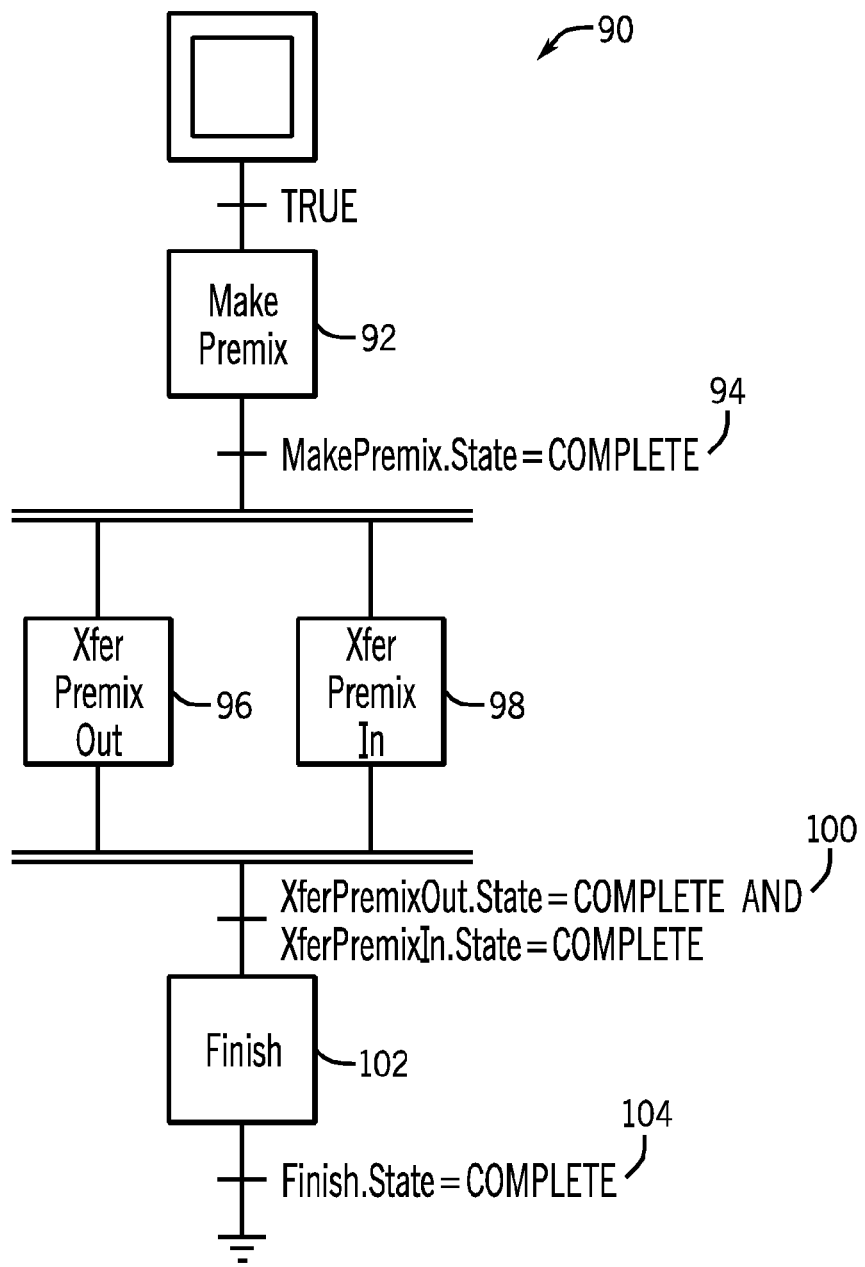
FIG. 8 is a third SFC, in accordance with one aspect of the disclosure.

FIG. 8 depicts an example of an embodiment of a topmost SFC 90 of an SFC hierarchy that may be capable of a simple two vessel mixing process. In the depicted example, a product in the manufacturing process requires that two materials be mixed in a "Premixer" for a period of time, and then the contents of the "Premixer" are transferred to a "Reactor" vessel for completion of the manufacturing process. Without incorporating the techniques disclosed herein, sequence structures to do this might be created as follows.

1. The batch procedure chart level sequence would define two unit requirements, a "Mixer" and a "Reactor".
2. The needed sequencing in the "Mixer" unit would be performed by two unit procedure chart sequences, one called "Make Premix" 92 and one called "XferPremixOut" 96.
3. The needed sequencing in the "Reactor" unit would be performed by two unit procedure chart sequences, one called "XferPremixIn" 98 and one called "Finish" 102.
4. The batch procedure chart structure would be traditionally created as depicted in FIG. 8 with transitions 94, 100, and 104.

Figure 9:
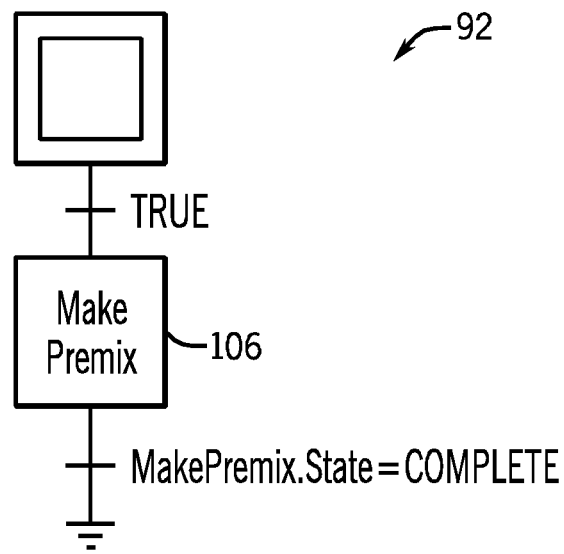
FIG. 9 is a fourth SFC, in accordance with one aspect of the disclosure.
Figure 11:
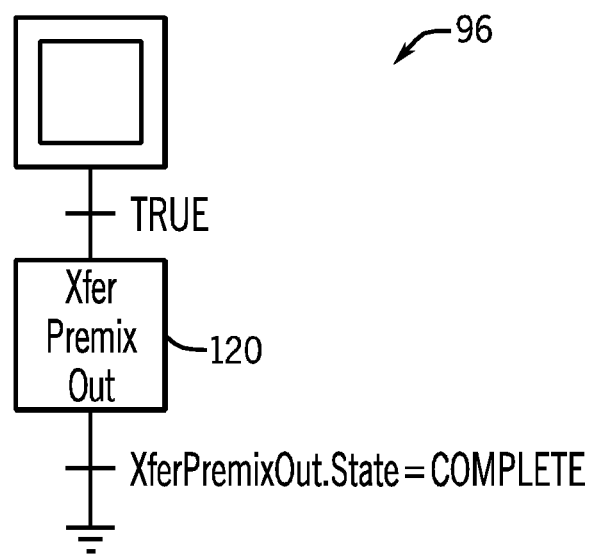
FIG. 11 is a sixth SFC, in accordance with one aspect of the disclosure.
Figure 10:
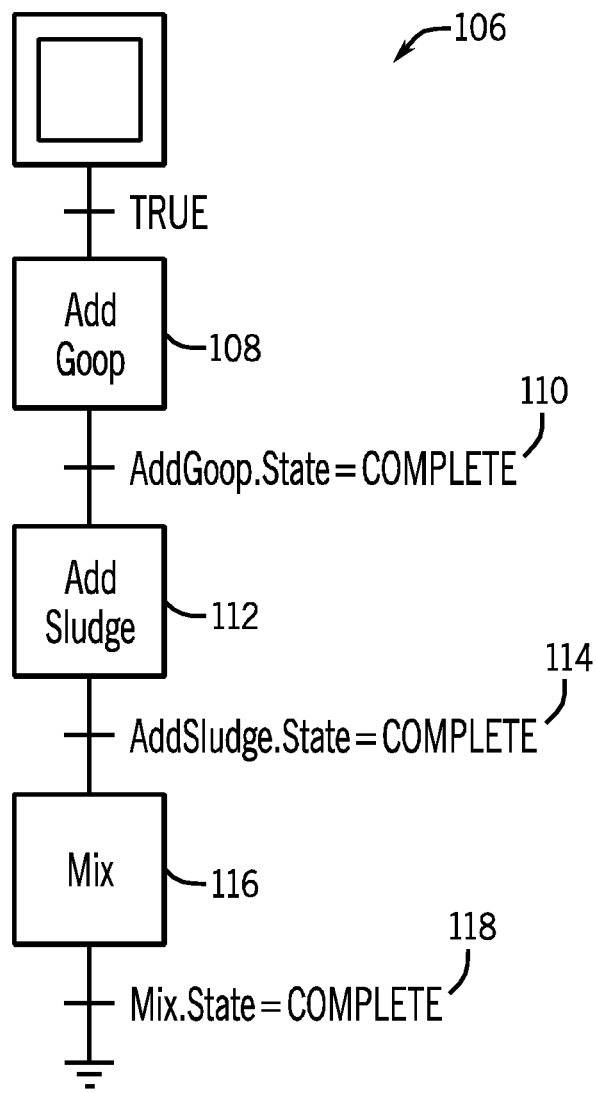
FIG. 10 is a fifth SFC, in accordance with one aspect of the disclosure.
Figure 12:
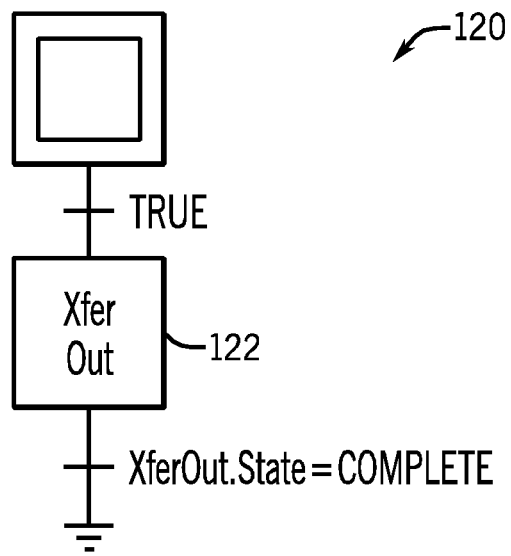
FIG. 12 is a seventh SFC, in accordance with one aspect of the disclosure.

While the implementation illustrated in FIG. 8 may provide the necessary synchronization between the starting of the Premix transfer-out logic and the Reactor transfer-in logic, it does so at the cost of artificially splitting the unit procedures for both vessels into two separate unit procedures. The first unit procedure for the Premixer vessel would be the "MakePremix" UPC 92. This unit procedure 92 would be created as a chart containing a single operation 106, depicted in FIG. 9. Further, the "MakePremix" unit operation 106 of the "MakePremix" unit procedure 92 would be created as depicted in FIG. 10. The figure depicts an "Add Goop" phase 108, followed by a "AddGoop.State=Complete" transition 110, followed by an "Add Sludge" phase 112, followed by a "AddSludge.State=Complete" transition 114. The transition 114 is then followed by a "Mix" phase 116, and then a final "Mix.State=Complete" transition 118. The second unit procedure for the Premixer vessel would be the "XferPremixOut" unit procedure 96. This unit procedure 96 would be created as a chart containing a single XferPremixOut operation 120, depicted in FIG. 11. Likewise, the "XferPremixOut" operation 120 would contain a single "XferOut phase" 122, as depicted in FIG. 12.

Figure 13:
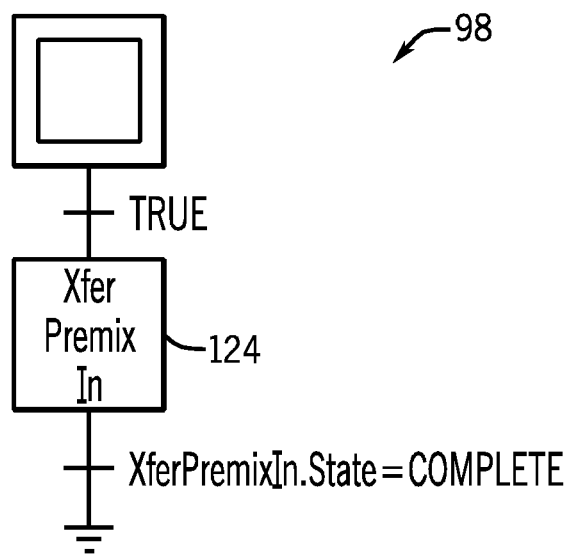
FIG. 13 is an eighth SFC, in accordance with one aspect of the disclosure.
Figure 14:
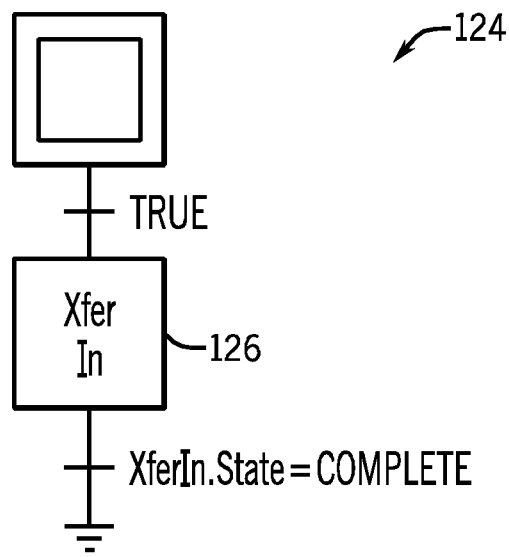
FIG. 14 is a ninth SFC, in accordance with one aspect of the disclosure.
Figure 15:
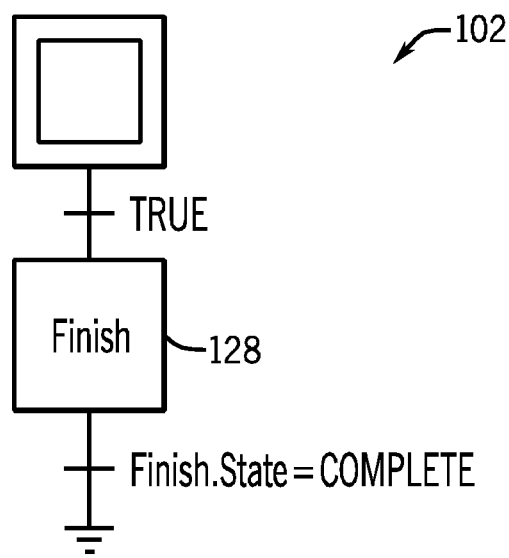
FIG. 15 is a tenth SFC, in accordance with one aspect of the disclosure.
Figure 16:
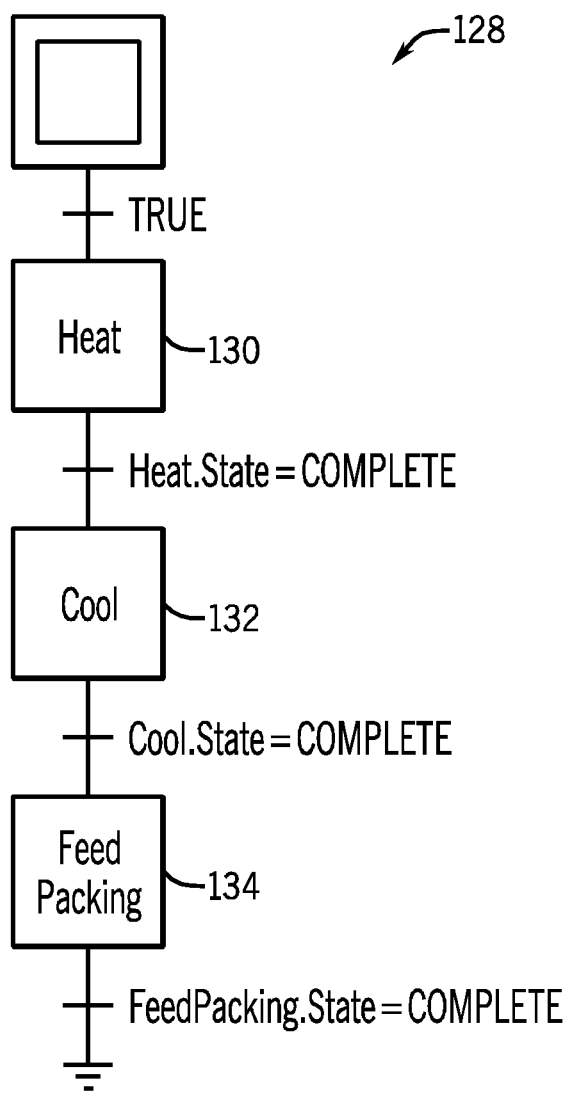
FIG. 16 is an eleventh SFC, in accordance with one aspect of the disclosure.

The first unit procedure for the "Reactor" vessel would be the "XferPremixIn" unit procedure 98. This unit procedure 98 would also be created as a chart containing a single operation "XferPremixIn" 124, depicted in FIG. 13. The "XferPremixIn" 124 operation may then be created with a contained "XferIn" phase 126, depicted in FIG. 14. The second unit procedure for the "Reactor" vessel would be the "Finish" unit procedure 102. This unit procedure 102 would be created as a chart containing a single "Finish" operation 128, depicted in FIG. 15. The "Finish" operation 128 could be defined to run three phases in series and would thus be created as depicted in FIG. 16. FIG. 16 illustrates the "Finish" operation 128 as consisting of a "Heat" phase 130, followed by a "Cool" phase 132, and finishing with a "FeedPacking" phase 134. Accordingly, the finish operation in this example first heats the product, then cools the product, and finally packages the product.

As illustrated by FIGS. 8-16, a simple process requiring basic synchronization requires several charts to achieve. Indeed, without the use of the techniques disclosed herein, the simple process typically requires a plurality of charts, such as those depicted in FIGS. 8-16. Visualizing and editing the process, even a process a simple as the process described, requires navigating through a multiplicity of charts at different levels. By way of contrast, the premixer process described in FIGS. 8-16 may be visualized using the techniques described herein in much simpler form, as described in more detail below.

Figure 17:
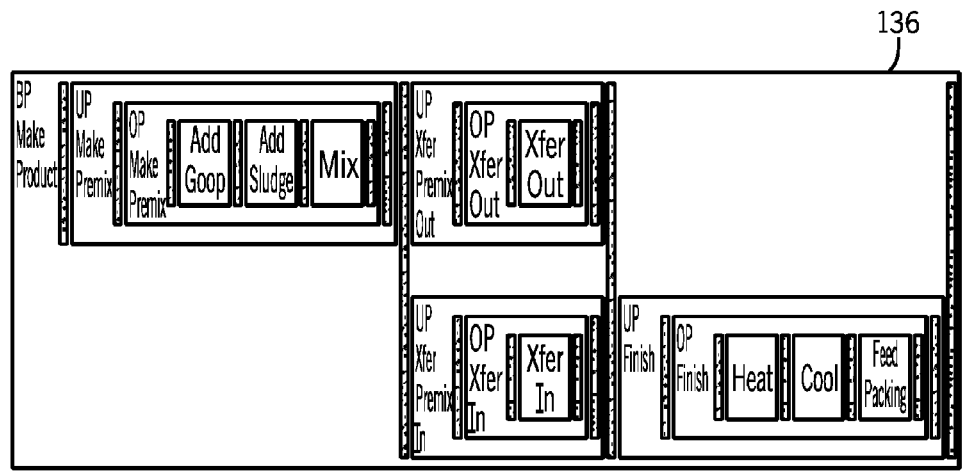
FIG. 17 is another embodiment of a group visualization, in accordance with one aspect of the disclosure.
Figure 18:
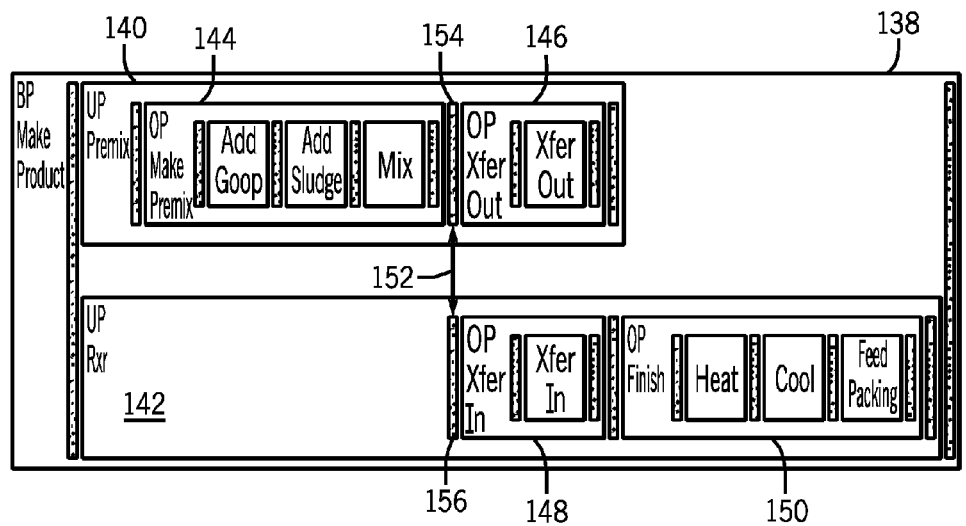
FIG. 18 is another embodiment of a transition group visualization, in accordance with one aspect of the disclosure.

FIGS. 17 and 18 depict embodiments of diagrams visualizing the two vessel mixing process described in FIGS. 8-16. More specifically, FIG. 17 utilizes a visualization group 136 to depict an entire SFC structure depicted in FIGS. 8-16 in a single display. Indeed, the concept of visualization groups, such as visualization group 136 of FIG. 17, allows the sequence author to create identical functionality with enhanced visualizations that allow for logical and reusable sequence structuring. For example, FIG. 18 depicts a restructuring of the hierarchical SFC structure that takes advantage of linked transition groups to improve the user visualization. Indeed, the user is able to very clearly visualize the encapsulation among groups, process lengths, and transition bars. Further, linked transitions may be visualized as depicted in FIG. 18 by visualization group 138. Indeed, FIG. 18 allows the visualization of a single unit procedure 140 for the Premixer vessel and a single unit procedure 142 for the Reactor vessel. This SFC more accurately represents how the units are used during the sequence in the plant. The "Premixer" unit procedure 140 sequence is constructed of two operations that run in series. The first is the "MakePremix" operation 144 and the second is the "XferOut" operation 146. The separation of the unit procedure 140 into two operations 144, 146 is beneficial as each operation is a potentially reusable sequence structure that could be used in other product configurations (for example, "XferOut" 146 could be used at the end of other Premix filling sequences).

Similarly, the "Rxr" unit procedure 142 sequence is constructed of two operations that run in series. The first is the "XferIn" operation 148, and the second is the "Finish" operation 150. Similar to the Premix operations, the reactor "Rxr" operations are also potentially reusable sequence structures that could potentially be used in other product configurations. The necessary synchronization between configured sequences for the two vessels is provided by defining a link 152 between two transitions 154, 156. The first transition 154 is the transition in the Premixer unit procedure 140, between the first and second operations. The second transition 156 is the first transition in the Reactor unit procedure 156. By linking these two transitions into members of the linked transition group 152, we ensure that the "XferOut" operation 146 and "XferIn" operation 156 are started at the same time. In this embodiment of the visualization group 138, the linked transition group may be depicted by a double-headed vertical arrow line identifying the transitions that are members of the linked group. Indeed, a single transition may have a plurality of arrows between the single transition and other transitions, each arrow representing a synchronization link. Accordingly, due to the improved techniques in SFC representations, including the use of linked transitions groups (i.e., synchronized transitions), the highest level chart would now appear as two unit procedures that execute in parallel, as depicted in FIG. 19.

Figure 19:
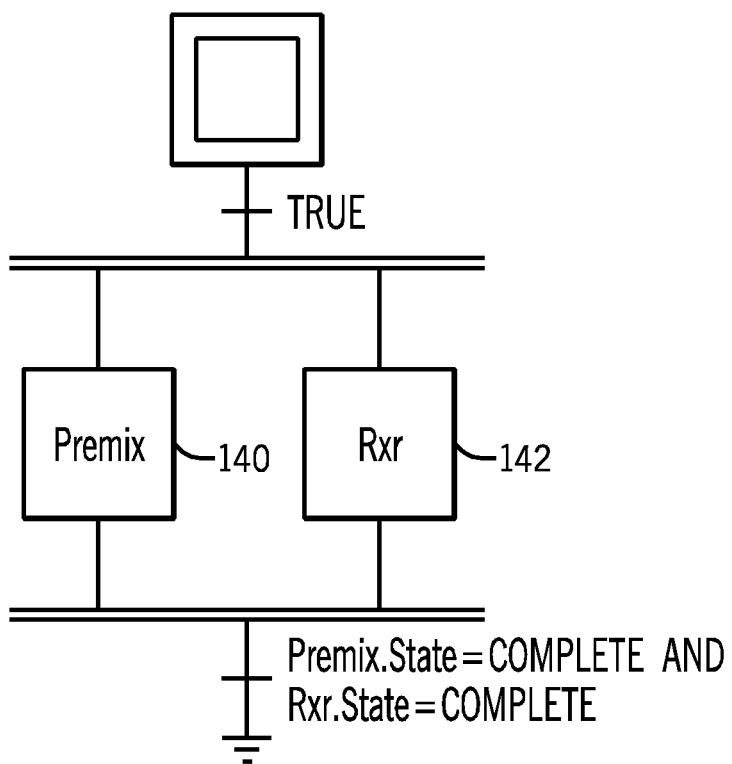
FIG. 19 is a twelfth SFC, in accordance with one aspect of the disclosure.
Figure 20:
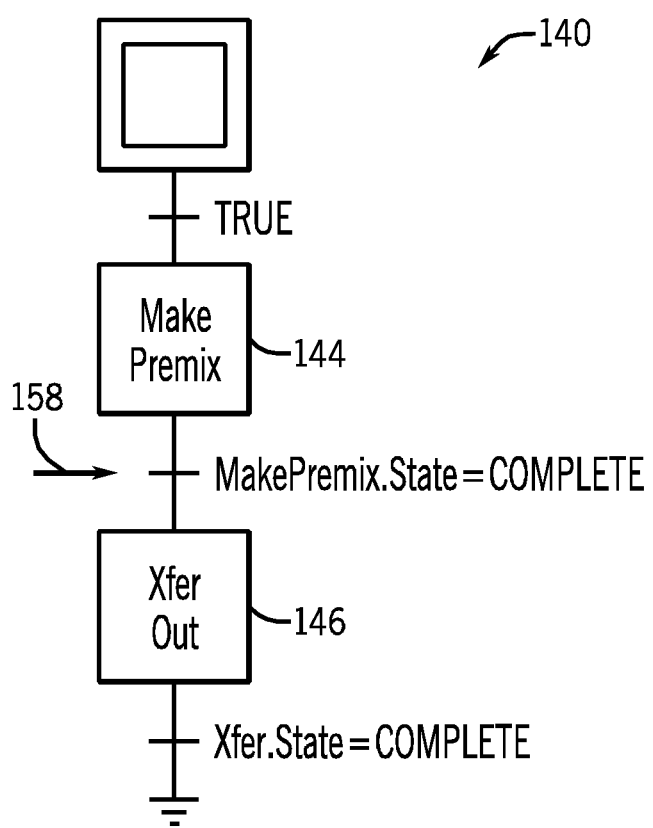
FIG. 20 is a thirteenth SFC, in accordance with one aspect of the disclosure.
Figure 21:
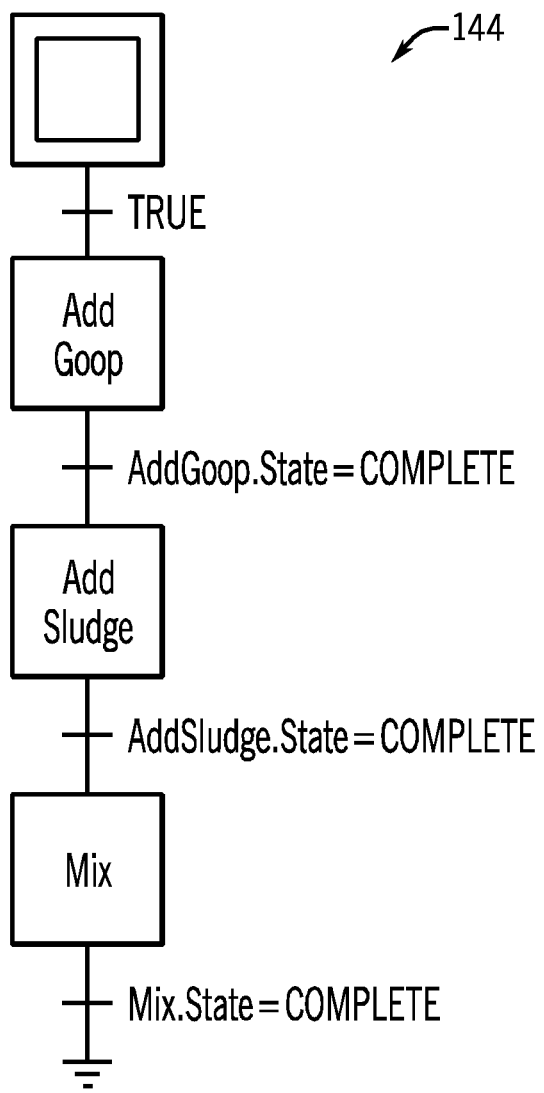
FIG. 21 is a fourteenth SFC, in accordance with one aspect of the disclosure.
Figure 22:
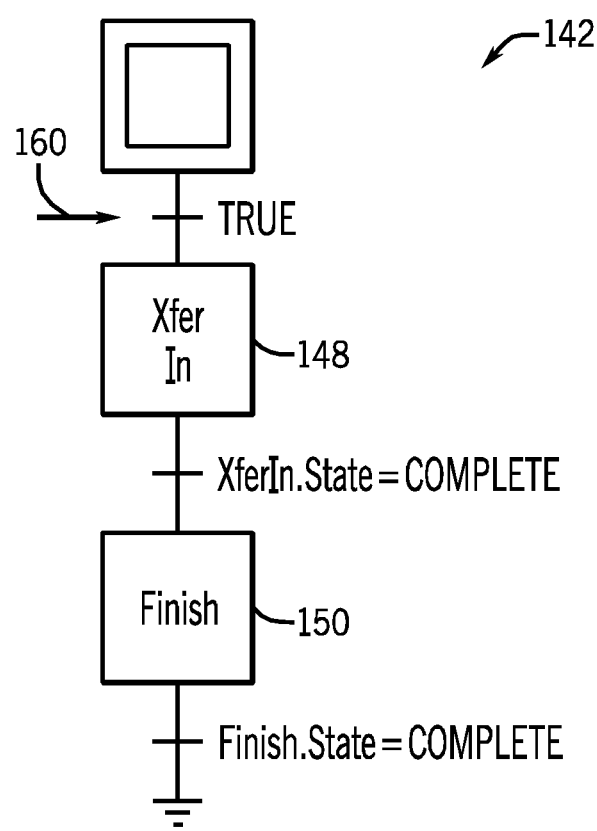
FIG. 22 is a fifteenth SFC, in accordance with one aspect of the disclosure.
Figure 23:
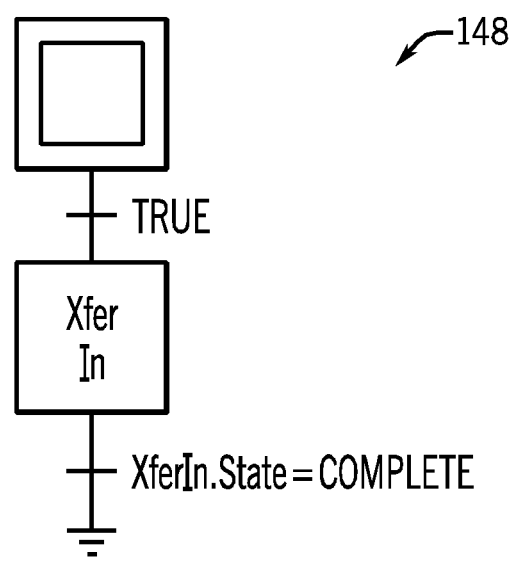
FIG. 23 is a sixteenth SFC, in accordance with one aspect of the disclosure.
Figure 24:
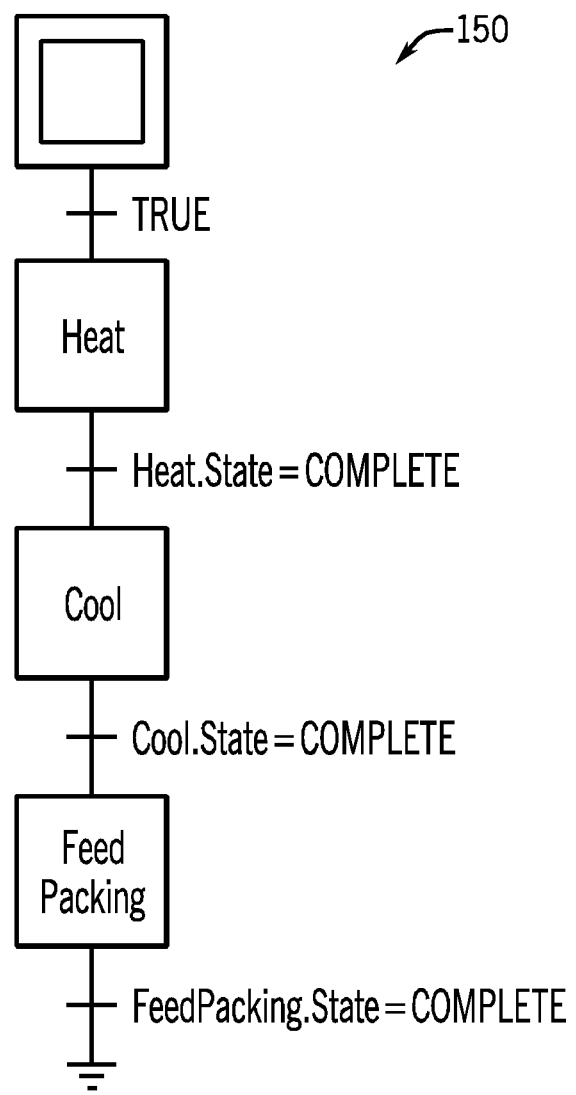
FIG. 24 is a seventeenth SFC, in accordance with one aspect of the disclosure.

FIG. 19 is much simpler to visualize and includes both unit procedures 140, 142. The "Premix" unit procedure 140, as previously described, contains two operations 144, 146 in series. The SFC chart for the "Premix" unit procedure 140 would appear as illustrated in FIG. 20. Note that the transition "MakePremix.State=Complete" that is a member of a linked transition group is marked by the arrow 158. The "MakePremix" operation 144 would be created as depicted in FIG. 21. The "Rxr" unit procedure 142, as previously described, contains two operations 148, 150 in series. The SFC chart for the "Rxr" unit procedure 142 would be created as depicted in FIG. 22. Similar to the "Premixer" unit procedure 140, the "Rxr" unit procedure 142 has an arrow 160 indicating that the transition "TRUE" is a member of the linked transition group. The "XferIn" operation 148 would be created as depicted in FIG. 23. The "Finish" operation 150 would be then be created as depicted in FIG. 24.

Indeed, the resulting SFC may be more visually informative and include synchronization enhancements capable of improved process control. Actions may now be linked to occur sequentially, and the process flow may be more adequately described. The linked transition group may include two or more transitions. Additionally, a transition may be associated (i.e., included as a member) of zero, one, or more transition groups. Further, a software tool may provide a mechanism to define an existing group (e.g., create the links), a mechanism to edit the links, a mechanism to discover all members of a transition group, and support of transition group expression evaluation of "grouped" behavior. Such mechanisms may allow for linked transition groups that may cross any of the SFC levels, such as crossing a unit procedure level into an operation level, as depicted in FIG. 25.

Figure 25:
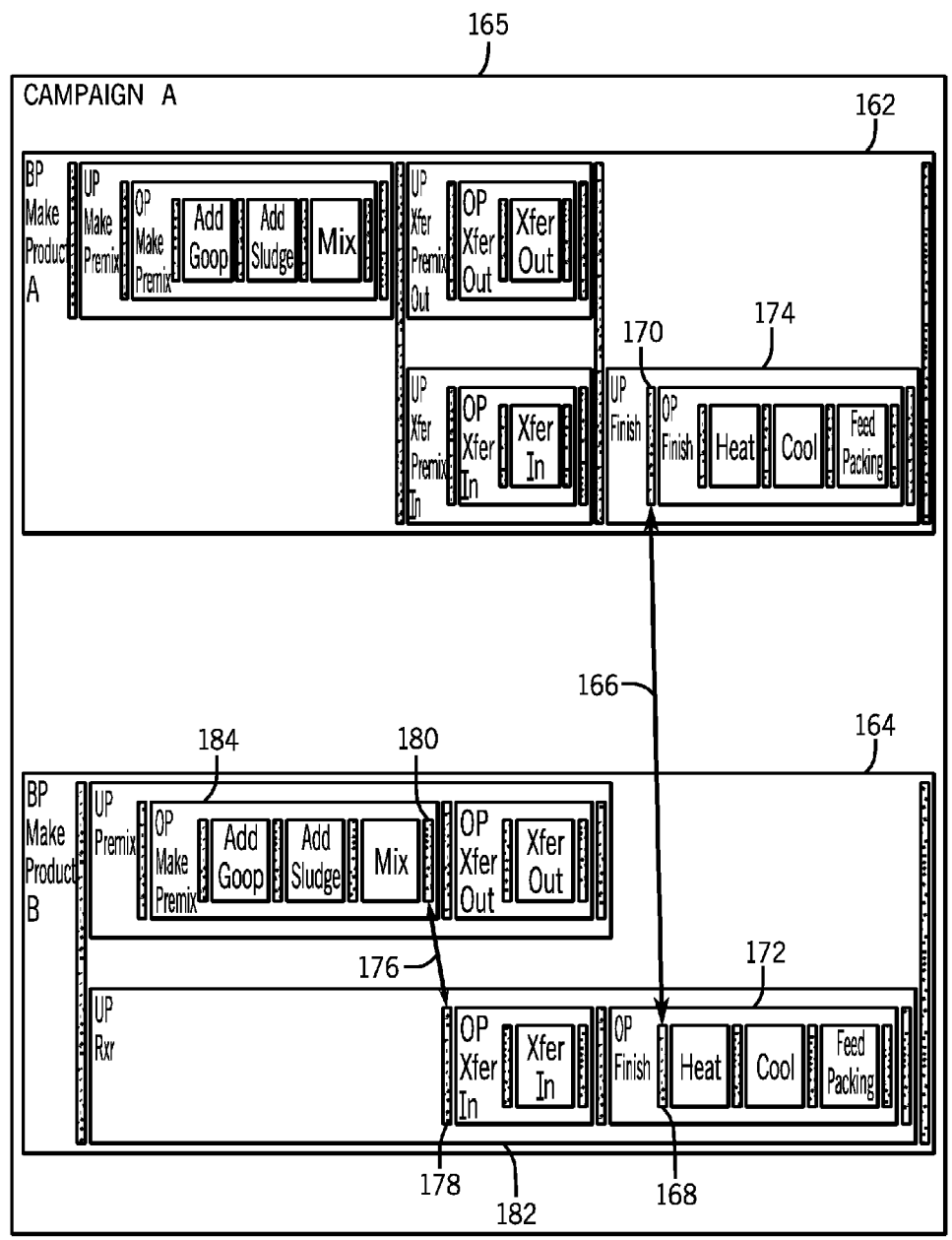
FIG. 25 is an embodiment of transition group visualization, in accordance with one aspect of the disclosure.

FIG. 25 illustrates an embodiment where two batch procedures may be synchronized. In the illustrated example, a batch procedure 162 may require some level of synchronization with a batch procedure 164. Accordingly, the batch procedure 162 and batch procedure 164 may be graphically contained in a "campaign A" structure, such as the campaign structure 165. A structure such as structure 165 may thus be the first common parent of the two batch procedures 162, 164 in which a linked transition group may be defined. Additionally, each batch procedure may be executed by a different automation controller 10. A link 166 may be used to group the transitions 168, 170. Indeed, the link 166 may be capable of linking transitions that cross batch procedures and that are at different levels inside of the batch procedures. More specifically, the depicted example shows that transition 168 is contained in operation 172 of the batch procedure 164 while transition 170 is contained in unit procedure 174 of batch procedure 162. Similarly, link 176 is depicted as linking transitions 178 and 180. Transition 178 is contained in unit procedure 182 while transition 180 is contained in operation 184. Indeed, the links, such as link 166, may traverse any number of levels and batch procedures. The levels may be crossed from the lowest level of the SFC to the highest level of another SFC or any level in between. Likewise, the links may cross the same level, such as when crossing from a unit procedure into another unit procedure. Such capabilities allow for a substantially complete synchronization of any set of sequence, including synchronization across sequences. In synchronizing across sequences where each sequence is executing in a different automation controller, techniques such as message passing, shared memory, message queues, semaphores, and so forth, may be used. Indeed, any number of concurrent computing techniques may be used to synchronize the execution of the grouped transitions.

Additionally, in certain embodiments, linked transition group validation may be used. Such validation may detect, for example, if it is not possible for all transitions within the group to be simultaneously active. In one example, logic may dictate for a deadlock where one transition must wait on the second transition and vice versa. Such occurrences would be detected by a validation that examines the transition and transition expressions for problem occurrences. In another example, a linked transition that during runtime executes over a defined time range (e.g., over 2 minutes, over 20 minutes) may be detected. The user may then be informed of such problem occurrences in order to allow corrections in the sequence. It is also to be understood that the synchronization mechanism is not restricted to a single processor or even a single automation controller. Indeed, a plurality of processors and/or controllers may be used to distribute portions of the sequence and the synchronization may then occur across all of the distributed processors and/or controllers. In one embodiment, a centralized controller may be used to disperse the work and synchronize across the plurality of controllers. Such a controller may have access to the states of all the SFC models in each of the various controllers. In other embodiments, a distributed system, for example a system using message passing, shared memory, message queues, semaphores, and so forth, may be used to distribute the workload and synchronization among one or more automation controllers. Indeed, such flexibility of implementation allows for a variety of embodiments capable of visualizing and synchronizing the process flowing through the SFC.

The invention claimed is:

1. A system for synchronizing an industrial process comprising:
an automation controller configured to control a plurality of sequential processes separated by transitions; and
a graphical transition group graphically linking a plurality of the transitions to synchronize execution of processes, wherein the graphical transition group comprises a graphical transition link configured to link a first transition in the plurality of transitions to a second transition in the plurality of transitions, wherein the graphical transition link is configured to monitor a first sequential process upstream of the first transition and a second sequential process upstream of the second transition to synchronize the execution of the first and the second transitions, and wherein the first sequential process comprises a first graphical bar representative of a first execution time of the first sequential process, and wherein the second sequential process comprises a second graphical bar representative of a second execution time of the second sequential process, wherein the first sequential process is visually displayed at a first length representative of the first execution time and the second sequential process is visually displayed at a second length representative of the second execution time, wherein the first and second sequential processes are controlled in at least two different process levels, wherein the transition group links transitions between processes of the at least two different process levels, and wherein a third sequential process having a lower process level than the first sequential process comprises a third graphical bar displayed inside of the first graphical bar.

2. The system of claim 1, wherein the processes are controlled in accordance with a sequential function chart (SFC) sequence processing program, and wherein the link is configured to execute the first and the second transitions approximately simultaneously when the first and the second sequential processes have finished execution.

3. The system of claim 2, wherein the sequence processing program comprises at least two different sequences, wherein the transition group links transitions between processes of at least two different sequences, and wherein each of the transitions belongs to either the transition group, a plurality of transition groups, or no transition group.

4. The system of claim 1, comprising a sequential function chart (SFC), wherein the plurality of sequential process are modeled by the SFC as a hierarchy of process levels, and wherein the automation controller follows the SFC logic to control the hierarchy of process levels.

5. The system of claim 4, wherein the SFC process levels comprises a batch procedure, a unit procedure, a unit operations, an equipment phase, or a combination thereof.

6. The system of claim 1, wherein the plurality of sequential processes separated by transitions are structured in a hierarchy of process levels comprising a plurality of levels.

7. The system of claim 6, wherein the transition group is configured to link between a first transition and a second transition, wherein the first transition and the second transition reside at the same level in the hierarchy.

8. The system of claim 6, wherein the transition group is configured to link between a first transition and a second transition, wherein the first transition and the second transition reside at different levels in the hierarchy.

9. The system of claim 1, wherein the transition group comprises a visualization showing all members of the transition group.

10. The system of claim 9, wherein the transition group visualization comprises a visualization of the linking between the transitions in the transition group.

11. The system of claim 1, wherein the processes separated by the linked transitions continue with their respective logic flow after all of the linked transitions have been evaluated by the automation controller.

12. A non-transitory computer-readable medium comprising code adapted to:
control plurality of sequential processes;
define a graphical transition group comprising linked transitions between processes; and
synchronize the linked transitions of the graphical transition group to synchronize the processes, wherein the graphical transition group comprises a graphical transition link configured to graphically link a first transition in the linked transitions to a second transition in the linked transitions, and wherein the transition link is configured to monitor a first sequential process upstream of the first transition and a second sequential process upstream of the second transition to synchronize the execution of the first and the second transitions, wherein the first sequential process is visually displayed at a first length representative of a first execution time and the second sequential process is visually displayed at a second length representative of a second execution time, wherein the first and second sequential processes are controlled at least two different process levels, and wherein the first sequential process comprises a first graphical bar representative of the first execution time of the first sequential process, and wherein the second sequential process comprises a second graphical bar representative of the second execution time of the second sequential process, wherein the first and second sequential processes are controlled in at least two different process levels, wherein the transition group links transitions between processes of the least two different process levels, and wherein a third sequential process having a lower process level than the first sequential process comprises a third graphical bar displayed inside of the first graphical bar.

13. The non-transitory computer-readable medium of claim 12, wherein the code is adapted to control the processes in accordance with a batch processing program.

14. The non-transitory computer-readable medium of claim 13, wherein the batch processing program comprises at least two different recipes, and wherein the transition group links transitions between processes of at least two different recipes.

15. The non-transitory computer-readable medium of claim 12, wherein the code is configured to permit programming via a graphical programming language.

16. The non-transitory computer-readable medium of claim 12, wherein the graphical code comprises a sequential function chart (SFC).

17. A method of synchronizing industrial processes executed by an automation controller comprising:
    defining a visual transition group comprising a first transition separating a first set of sequential processes, wherein each of the first set of sequential processes is visually displayed at a first length of a first graphical bar representative of a first execution time for each of the first set of sequential processes, and a second transition separating a second set of sequential processes, wherein each of the second set of sequential processes is visually displayed at a second length of a second graphical bar representative of a second execution time for each of the second set of sequential processes; and
    defining a visual link between the first transition and the second transition that, during execution of the processes, will synchronize evaluation of the first and the second linked transitions for execution of the processes, wherein the first and second sets of sequential processes are controlled in at least two different process levels, wherein the transition group links transitions between processes of the at least two different process levels, and wherein a third set of sequential process having a lower process level than the first set of sequential process comprises a third graphical bar displayed inside of the first graphical bar.

18. The method of claim 17, wherein the first and second sets of sequential processes are defined in a sequence processing program.

19. The method of claim 18, wherein the sequence processing program comprises at least two different sequences, wherein the transition group links transitions between sequential processes of at least two different sequences.

20. A system for synchronizing an industrial process comprising:
    a processor configured to execute a program visualization tool configured to generate a user-viewable representation of a hierarchy of a plurality of controllable sequential processes in a graphical programming language, wherein the user-viewable representation of the hierarchy comprises a first representation of a first sequential process displayed inside a second representation of a second sequential process, wherein the first sequential process is visually displayed at a first length representative of a first execution time and the second sequential process is visually displayed at a second length representative of a second execution time, wherein the first and second sequential processes are controlled in at least two different process levels, and wherein the first sequential process comprises a first graphical bar representative of the first execution time of the first sequential process, and wherein the second sequential process comprises a second graphical bar representative of the second execution time of the second sequential process, wherein a transition group links transitions between processes of the at least two different process levels, and wherein a third sequential process having a lower process level than the first sequential process comprises a third graphical bar displayed inside of the first graphical bar.

21. The system of claim 20, wherein the graphical programming language is a sequence process programming language based on the IEC-61131 standard, the ANSI/ISA S88.01 standard, or a combination thereof, and wherein the first representation comprises a bar.

22. The system of claim 21, wherein the graphical programming language is a sequential functional chart programming language, wherein a synchronization includes utilizing the transition group having two or more transitions, and wherein a validation is used to validate the two or more transitions.

* * * * *